Oct. 12, 1937.  C. A. FUGIT  2,095,520
WINDBREAK
Filed May 14, 1934  2 Sheets-Sheet 1
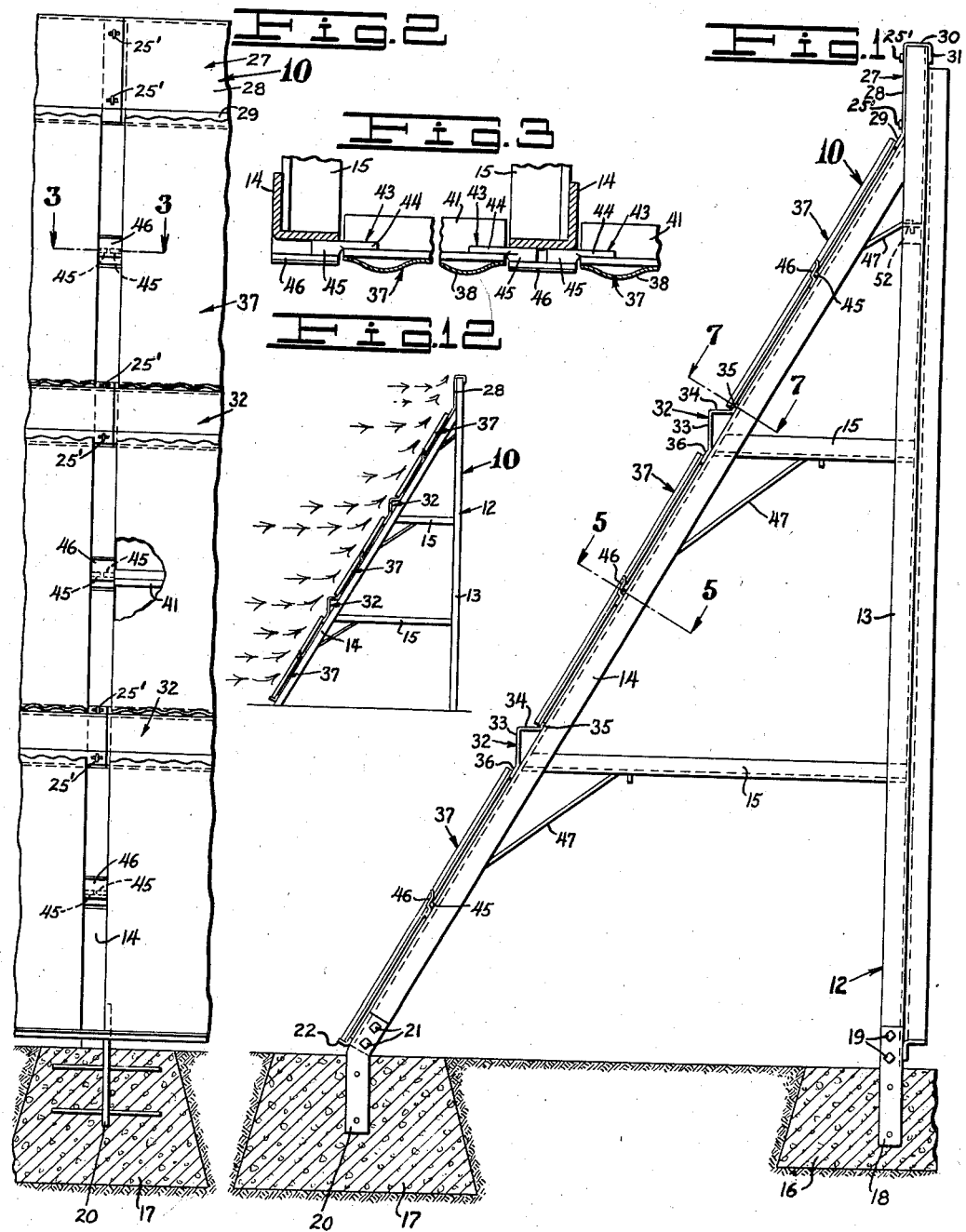
INVENTOR.
C. A. FUGIT
BY
ATTORNEY.

Oct. 12, 1937.  C. A. FUGIT  2,095,520
WINDBREAK
Filed May 14, 1934  2 Sheets-Sheet 2
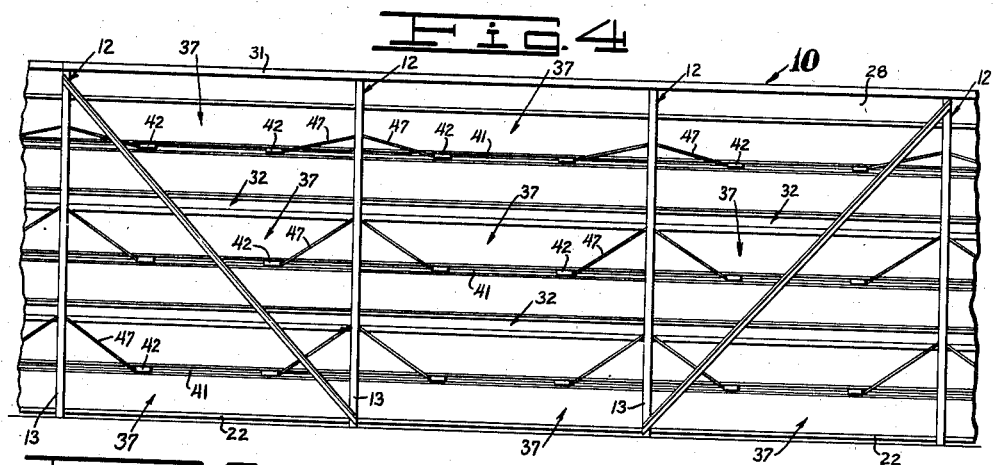
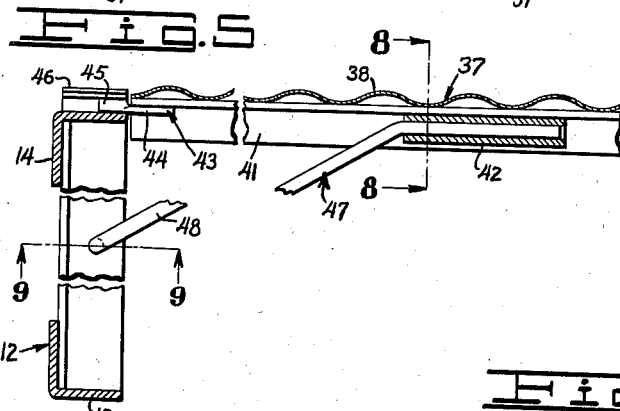
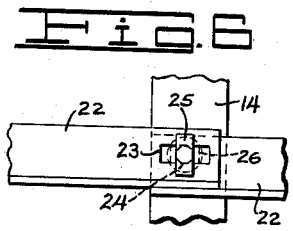
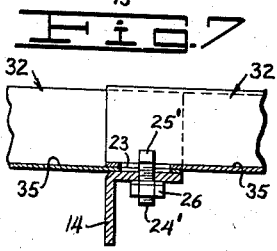
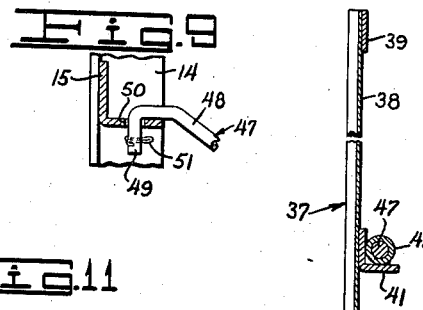
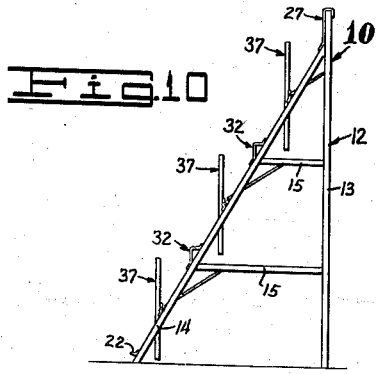
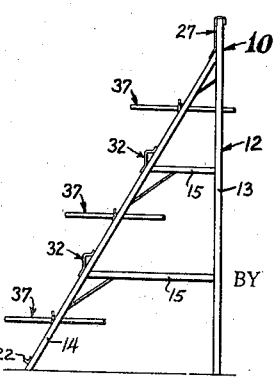
INVENTOR.
C. A. FUGIT
BY
ATTORNEY.

Patented Oct. 12, 1937

2,095,520

UNITED STATES PATENT OFFICE 2,095,520

WINDBREAK

Carl A. Fugit, Alhambra, Calif.

Application May 14, 1934, Serial No. 725,549

11 Claims. (Cl. 104—278)

This invention relates to improvements in wind breaks.

The general object of the invention is to provide an improved wind break for use in protecting fruit orchards and for use by railways against snow and for other uses.

Another object of the invention is to provide a wind break or deflector including means for entirely restricting the flow of air therethrough.

A further object of the invention is to provide a wind break including novel means for deflecting air currents directed thereagainst.

Other objects and the advantages of this invention will be apparent from the following description taken in connection with the accompanying drawings wherein:

Fig. 1 is an end view of my improved wind break;

Fig. 2 is a fragmentary front view of the device shown in Fig. 1;

Fig. 3 is a fragmentary enlarged section taken on line 3—3 of Fig. 2;

Fig. 4 is a fragmentary rear view of the wind break on a reduced scale;

Fig. 5 is an enlarged fragmentary section taken on line 5—5 of Fig. 1;

Fig. 6 is an enlarged fragmentary front view of a portion of the wind break;

Fig. 7 is an enlarged fragmentary section taken on line 7—7 of Fig. 1;

Fig. 8 is a fragmentary section taken on line 8—8 of Fig. 5;

Fig. 9 is a section taken on line 9—9 of Fig. 5;

Fig. 10 is a view similar to Fig. 1 showing the panels in a different position;

Fig. 11 is a view similar to Fig. 10 showing another position of the panels; and, Fig. 12 is a view similar to Fig. 1 diagrammatically showing the deflection of air currents directed against the wind break.

Referring to the drawings by reference characters I have indicated my improved wind break generally at 10. As shown the wind break 10 includes a plurality of spaced standards 12 each of which includes a vertical member 13 which is shown as an angle iron and an inclined member 14 which is shown also as an angle iron. The upper end of the inclined member 14 is secured to the vertical member 13 as by welding it thereto at a predetermined distance below the top of the vertical member. Intermediate the height of the standards the vertical members 13 and the inclined members 14 are connected by a pair of horizontal brace members 15 which may be secured to the vertical members and the inclined members by welding them thereto.

For supporting each of the standards 12 I provide a rear base member 16 and a front base member 17 each of which are preferably made of concrete and are adapted to be buried so that the ground line is flush with their upper faces. Embedded in the rear concrete base 16 I provide a metal strap 18 which is secured to the vertical member 13 by bolts 19 and embedded in the front base 17 I provide a metal strap 20 which is secured to the inclined member 14 by bolts 21.

Adjacent their lower ends the adjacent pairs of inclined members 14 are connected by horizontal angle members 22. As shown in Fig. 6 each of the angle members 22 adjacent the associated inclined members 14 includes an elongated aperture 23 in which a bolt 24 is positioned. The bolt 24 includes a head portion 25 which has a width substantially equal to the diameter of the bolt and has a length greater than the diameter of the bolt. The bolt 24 is also positioned in a suitable aperture provided in the inclined member 14 and is clamped in position by a nut 26. Thus to remove the members 22 it is only necessary to turn the bolt heads 25 horizontal to match the apertures 23 after which the members 22 may be removed.

Adjacent their upper ends the standards 12 are connected by a plurality of plates 27 each of which includes a vertical section 28 overlaying the front of the vertical members and having at its lower end a rest portion 29 which engages the inclined members 14. The plates 27 further include a top portion 30 which extends over the tops of the vertical members 14 and a rear portion 31 which extends downwardly a short distance.

Equally spaced between the angle member 22 and the rest portion 29 of the plates 27 I provide deflector plates 32. As shown each of the deflector plates 32 includes a vertical portion 33 and a horizontal portion 34. Extending upwardly from the horizontal portion 34 the deflector plate includes a rest portion 35 of predetermined length and extending downwardly from the vertical portion 33 I provide a rest portion 36 which is approximately twice the length of the rest portion 35.

As shown the plates 27 and the deflector plates 32 like the angle members 22 are secured to the inclined members 14 by bolts 24' having heads 25'. The bolts 24' pass through the portions 35 and 36.

Supported between each pair of standards 12 I show three panel members 37. As shown in Figs.

3, 5, and 8 each panel member 37 includes a face plate 38 which is shown as made of corrugated metal having a reinforcing bar 39 spot-welded thereto adjacent its upper edge and a similar reinforcing bar 40 similarly secured thereto adjacent its lower edge. Intermediate the height of the panel I secure thereto as by welding an angle member 41 on which I provide a pair of spaced cylindrical members 42 which may be secured to the angle member by welding. At each end of the angle member 41 I provide a pivot member 43 each of which may include a flat portion 44 which is secured to the angle member by welding and a portion 45 which extends beyond the adjacent end of the angle member.

As shown in Fig. 1 the lower end of the bottom panel 37 rests on the angle member 22 while the upper portion engages the lower rest portion 36 of the lower deflector plate 32. The intermediate panel members 37 engage the upper rest portion 35 of the lower deflector plate 32 while the upper portion of this panel engages the lower rest portion 36 of the upper deflector plate 32. The lower portions of the upper panel members engage the upper rest portion 35 of the upper deflector plate 32 while the upper portions of this panel engage the rest portion 29 of the plate 27.

To prevent accidental dislodgment of the panels 37 I provide, on the inclined members 14, hooked members 46 which have their open ends upward. When the panels 37 are positioned on the standards the pivot members 45 of the panels are positioned between the hook members 46 and the inclined members 14 (see Figs. 3 and 5).

Positioned in each of the cylindrical members 42 of the panels 37 I provide a brace rod 47 each of which includes a rearwardly and upwardly inclined portion 48, which terminates in a downwardly extending vertical end portion 49 (see Fig. 9). The vertical portions 49 of the rods 47 which are associated with the lower and intermediate panels 37 are positioned in apertures 50 provided in the horizontal brace members 15. To prevent accidental dislodgment of the brace rods a cotter pin 51 may be positioned in suitable apertures provided in the vertical portion 49 of the rod. The vertical ends 49 of the rods 47 which are associated with the upper panels are positioned in suitable apertures provided in angle members 52 which are secured to the vertical members 13 of the standards 12 (see Fig. 1).

When the panels 37 are in the position shown in Fig. 1 they prevent wind which is directed thereagainst in the direction indicated by the arrows in Fig. 12 from passing through the wind break. Furthermore, when the air currents strike the deflector plates 37 these currents are deflected upward thus reducing the pressure on the panels. Likewise the plate 27 deflects the air currents upward thereby increasing the effectiveness of the wind break to a greater height than the actual height of the wind break.

If desired to let some air pass through the wind break the panels 37 may be moved upwardly off their lower rests and swung to a vertical position as shown in Fig. 10. If a free passage of air through the wind break is desired the panels 37 may be swung to a horizontal position as shown in Fig. 11. By positioning the cylindrical members 42 approximately in line with the pivot members 45 and fastening the vertical end 49 of the rods 47 above the pivots and allowing some slack in the various connections the various positions of the panels 37 may be had without disconnecting the brace rods 47.

From the foregoing description it will be apparent that I have provided a novel wind break which is simple in construction and highly efficient in use.

Having thus described my invention, I claim:

1. In a wind break, a supporting frame comprising a plurality of spaced standards, each of said standards including a rear member and an inclined member, a plurality of panel members between each of said standards and positioned one above the other, means to retain said panels in a position substantially parallel to said inclined member, a deflector plate positioned between adjacent panels of each superimposed pair of panels, said deflector plate including a substantially vertical face adapted to direct wind away from said panels thereabove, and a plate member secured to said vertical members above said inclined members, said plate member including a substantially vertical face adapted to direct wind upward.

2. In a wind break, a supporting frame comprising a plurality of spaced standards, each of said standards including an inclined member, a plurality of panel members between each of said standards positioned one above the other, means to pivotally support said panels on said inclined members, said panels being movable about said pivots to various positions, means to retain said panels in a position substantially parallel to said inclined members, a brace member adjacent each end of each panel, one end of said brace members being slackly connected to a portion of the adjacent standard and means connecting the opposite ends of said brace members and said panels whereby said panels may be swung to various positions without disconnecting said brace rods.

3. In a wind break, a supporting frame comprising a plurality of spaced standards, each of said standards including a rear member and an inclined member, said inclined member being secured to said rear member, a plurality of panel members between each of said standards and positioned one above the other, each of said panels having a pivot member at opposite ends thereof, hooked members on each of said inclined members, said panel pivots being positioned in said hooked members, means to retain said panels in a position substantially parallel to said inclined member, a deflector plate positioned between adjacent panels of each superimposed pair of panels, said deflector plate including a substantially vertical face adapted to direct wind away from said panels thereabove, and a plate member secured to said vertical members above said inclined members, said plate member including a substantially vertical face adapted to direct wind upward.

4. In a wind break, a supporting frame comprising a plurality of spaced standards, each of said standards including a rear member and an inclined front member, a plurality of panel members between each of said standards positioned one above the other, means to pivotally support said panels on said inclined members, said panels being movable about said pivots to various positions, means to retain said panels in position substantially parallel to said inclined members, each of said panels including a bearing member adjacent each end and to the rear thereof, said bearing members having an aperture therein, a brace rod associated with each of said bearing members, one end of each rod being positioned in a bearing aperture, and being pivotally and slidably movable therein, said rod inclining upwardly and rearwardly from said bearing and the end of said rod opposite said bearing being slackly connected to a portion of an adjacent standard.

5. In a wind break, a supporting frame comprising a plurality of spaced standards, each of said standards including a rear member and an inclined front member, said inclined members being secured to said rear members, a plurality of superimposed panel members pivoted between each of said standards, a deflector plate positioned between adjacent panels of each superimposed pair of panels, each of said deflector plates including a portion engaging the adjacent panels, a horizontally extending member secured adjacent the bottoms of said inclined members, the lower portions of the lowermost panels being supported by said last mentioned member, a plate member secured to said vertical members and overlaying the forward faces thereof above said inclined members, said plate at its lower end including a rest portion, the upper portions of the upper panel members engaging said rest portion of said plate member, a brace rod, one end of said rod engaging a panel and the other end of said rod being slackly connected to a portion of an adjacent standard.

6. In a wind break, a supporting frame comprising a plurality of spaced standards, each of said standards including a vertical rear member and an inclined front member, said inclined members being secured to said vertical members below the tops thereof, a plurality of panel members between each of said standards positioned one above the other, each of said panels having a pivot member intermediate the height thereof at opposite ends, hooked members on each of said inclined members, said panel pivot members being positioned in said hooked members, a deflector plate positioned between adjacent panels of each superimposed pair of panels, each of said deflector plates including a substantially vertical face forward of said inclined members, each of said deflector plates including means engaged by the lower portions and upper portions of adjacent panels to retain said panels in positions substantially parallel to said inclined members, a horizontally extending angle member secured adjacent the bottoms of said inclined members, the lower portions of the lowermost panels being supported by said angle member, a plate member secured to said vertical members and overlaying the forward faces thereof above said inclined members, said plate at its lower end including a rest portion, the upper of the upper panel members engaging said rest portion of said plate member.

7. In a wind break, a supporting frame comprising a plurality of spaced standards, each of said standards including a vertical rear member and an inclined front member, said inclined members being secured to said vertical members, a plurality of panel members between each of said standards and positioned one above the other, each of said panels having a pivot member intermediate the height thereof and at opposite ends, supports on each of said inclined members for said panel pivot members, a deflector plate positioned between adjacent panels of each superimposed pair of panels, each of said deflector plates including a substantially vertical face forward of said inclined members, each of said deflector plates including portions engaged by the lower portions and upper portions of adjacent panels, a horizontally extending member secured adjacent the bottoms of said inclined members, the lower portions of the lowermost panels being supported by said horizontal member, a plate member secured to said vertical members and overlaying the forward faces thereof above said inclined members, the upper portions of the upper panel members engaging a portion of said plate member, each of said panels including a bearing member adjacent each end to the rear thereof and intermediate the height thereof, said bearing member having an aperture therein, a brace rod, one end of said rod being positioned in said bearing aperture and being pivotally and slidably movable therein, said rod inclining upward and rearward from said bearing and the end of said rod opposite said bearing being slackly connected to a portion of an adjacent standard.

8. In a wind break, a supporting frame comprising a plurality of spaced standards, each of said standards including a vertical rear member and an inclined front member, said inclined members being secured to said vertical members below the tops thereof, a plurality of panel members between each of said standards and positioned one above the other, each of said panels having a pivot member intermediate the height thereof and at opposite ends, open topped hooked members on each of said inclined members, said panel pivot members being positioned in said hooked members, a deflector plate positioned between adjacent panels of each superimposed pair of panels, each of said deflector plates including a substantially vertical face forward of said inclined members, each of said deflector plates including portions engaged by the lower portions and upper portions of adjacent panels to retain said panels in positions substantially parallel to said inclined members, a horizontally extending angle member secured adjacent the bottoms of said inclined members, the lower portions of the lowermost panels being supported by said angle member, a plate member secured to said vertical members and overlaying the forward faces thereof above said inclined members, said plate at its lower end including a rest portion, the upper portions of the upper panel members engaging said rest portion of said plate member, each of said panels including a bearing member adjacent each end to the rear thereof and intermediate the height thereof, said bearing member having an aperture therein, a brace rod, one end of said rod being positioned in said bearing aperture and being pivotally and slidably movable therein, said rod inclining upward and rearward from said bearing and the end of said rod opposite said bearing being slackly connected to a portion of an adjacent standard.

9. In a wind break, a supporting frame including an inclined member, a plurality of panel members, means on said inclined member and engaging said panels to secure said panels spaced one above the other in a position substantially parallel to said inclined member, and a deflector plate inclined further from the horizontal than said panels are positioned between superimposed pairs of panels.

10. In a wind break, a supporting frame including an inclined member, a plurality of panel members positioned one above the other and supported in inclined manner on said inclined member and a deflector plate positioned between said superimposed panel members, said deflector plate including a portion arranged forward of the adjacent panel members, said deflector plates being inclined farther from the horizontal than said panels.

11. In a wind break, a fixed supporting frame, a plurality of independently mounted, pivoted panels supported on said frame one above the other, means to retain said panels in an adjusted position, said panels in one position being adapted to prevent wind from passing through said frame and deflecting means on said frame arranged between panels of each superimposed pair of panels and inclined at an angle to the panels when the latter are in their adjusted position to deflect wind away from said panels.

CARL A. FUGIT.